(12) United States Patent
Werth et al.

(10) Patent No.: US 8,471,917 B2
(45) Date of Patent: *Jun. 25, 2013

(54) NIGHT VISION CAMERA MOUNT QUICK DISCONNECT

(75) Inventors: Douglas Werth, Lake Orion, MI (US); Patrick Jarboe, Clarkston, MI (US)

(73) Assignee: Autoliv ASP, Inc., Ogden, UT (US)

( * ) Notice: Subject to any disclaimer, the term of this patent is extended or adjusted under 35 U.S.C. 154(b) by 273 days.

This patent is subject to a terminal disclaimer.

(21) Appl. No.: 12/750,080

(22) Filed: Mar. 30, 2010

(65) Prior Publication Data

US 2010/0309314 A1 Dec. 9, 2010

Related U.S. Application Data

(63) Continuation of application No. 11/101,868, filed on Apr. 8, 2005, now Pat. No. 7,733,370.

(51) Int. Cl.
*H04N 5/225* (2006.01)

(52) U.S. Cl.
USPC .......... 348/216.1; 348/61; 348/143; 348/148; 348/158

(58) Field of Classification Search
USPC ............. 348/61, 216.1, 73–376, 333.07, 837, 348/148, 143, 158
See application file for complete search history.

(56) References Cited

U.S. PATENT DOCUMENTS

| | | | |
|---|---|---|---|
| 4,063,258 A | 12/1977 | Allen | |
| 4,499,504 A | 2/1985 | Edakubo et al. | |
| 4,615,597 A | 10/1986 | Burriss | |
| 4,772,902 A | 9/1988 | Inoue et al. | |
| 4,936,409 A * | 6/1990 | Nix et al. | 180/68.5 |
| 5,012,335 A | 4/1991 | Cohodar | |
| 5,121,147 A | 6/1992 | Wada et al. | |
| 5,260,731 A | 11/1993 | Baker et al. | |
| 5,341,171 A | 8/1994 | Mori et al. | |
| 5,619,036 A | 4/1997 | Salvio et al. | |
| 5,696,555 A * | 12/1997 | Kashimura | 348/316 |
| 5,835,808 A | 11/1998 | Parker et al. | |
| 5,938,155 A | 8/1999 | Garland | |
| 5,997,163 A | 12/1999 | Brown | |
| 6,085,131 A | 7/2000 | Kim | |
| 6,175,300 B1 | 1/2001 | Kendrick | |
| 6,364,259 B1 | 4/2002 | Boudard | |
| 6,509,832 B1 | 1/2003 | Bauer et al. | |
| 6,535,242 B1 | 3/2003 | Strumolo et al. | |

(Continued)

OTHER PUBLICATIONS

U.S. Appl. No. 11/101,868 Notice of Allowance mailed Feb. 5, 2010.

(Continued)

*Primary Examiner* — Sinh Tran
*Assistant Examiner* — Paul Berardesca
(74) *Attorney, Agent, or Firm* — Brinks Hofer Gilson & Lione

(57) ABSTRACT

The night vision camera system includes a light, a night vision camera, and a linkage. The night vision camera is attached to the light such that the light and camera maintain a fixed orientation with respect to each other. The light is attached to the linkage and is configured to manipulate the light and night vision camera concurrently. The linkage is attached to the vehicle and extends into the vehicle interior where a handle is provided allowing the user to aim the light and night vision camera from the interior of the vehicle.

15 Claims, 9 Drawing Sheets

U.S. PATENT DOCUMENTS

| | | | |
|---|---|---|---|
| 6,587,152 B1 | | 7/2003 | Sharp et al. |
| 6,611,200 B2 | | 8/2003 | Pressnall et al. |
| 6,693,519 B2 | | 2/2004 | Keirstead |
| 7,063,553 B1 | * | 6/2006 | Mullen .................. 439/336 |
| 7,077,582 B2 | | 7/2006 | Johnson |
| 2002/0168185 A1 | * | 11/2002 | Hagiuda et al. ............ 396/155 |
| 2002/0186317 A1 | | 12/2002 | Kayanuma |
| 2003/0001734 A1 | | 1/2003 | Schofield et al. |
| 2004/0105024 A1 | | 6/2004 | Takahashi |
| 2006/0055821 A1 | | 3/2006 | Sousa |

OTHER PUBLICATIONS

U.S. Appl. No. 11/101,868 Non-Final Office Action mailed Aug. 25, 2009.

U.S. Appl. No. 11/101,868 Final Office Action mailed Jun. 9, 2009.

U.S. Appl. No. 11/101,868 Non-Final Office Action mailed Nov. 13, 2008.

U.S. Appl. No. 11/101,868 Non-Final Office Action mailed Apr. 17, 2008.

\* cited by examiner

NIGHT VISION CAMERA MOUNT QUICK DISCONNECT

The present patent document is a continuation of pending U.S. patent application Ser. No. 11/101,868, filed Apr. 8, 2005 now U.S. Pat. No. 7,733,370, the entire contents of which is hereby incorporated by reference.

FIELD OF THE INVENTION

The present invention generally relates to a night vision camera system for a motor vehicle.

BACKGROUND

Spotlights have been provided for police vehicles for many years. The spotlights can be used to help the officer view the surrounding environment at night without leaving the vehicle. Over the years, enhancements have been made to the spotlights including a linkage that extends through the door of the vehicle allowing remote control aiming of the spotlight. The linkage includes a handle inside the vehicle allowing the officer to manipulate the aiming direction of the spotlight. The positioning of the spotlight linkage extending through the "A" pillar of the door allows easy and ergonomic access for the officer while driving the vehicle. In addition, officers have become comfortable with manipulation of a fairly standard design of control linkage that is attached to the spotlight allowing ease of use and improved manipulation through important scenarios that the officer may face on a daily basis.

Although remote control vehicle spotlights provide improved visibility for the officer, many situations exist where even with the spotlight is difficult to discern the environment from within the vehicle. Further, situations may also arise where the officer may wish to have improved perception of the environment without identifying his position. With the spotlight, it is quite easy for anyone nearby to see and identify the location of the police vehicle and potentially evade detection.

In view of the above, it is apparent that there exists a need for vision system which overcomes the above-mentioned shortcomings of the prior art.

SUMMARY OF THE INVENTION

In satisfying the above need, as well as overcoming the enumerated drawbacks and other limitations of the related art, the present invention provides a night vision camera system for a vehicle.

The night vision camera system of this invention includes a light, a night vision camera, and a linkage. The night vision camera is attached to the light such that the light and camera maintain a fixed orientation with respect to one another. The light is attached to the linkage and is configured to manipulate the light and night vision camera concurrently. The linkage is attached to the vehicle and extends into the vehicle interior where a handle is provided allowing the user to aim the light and night vision camera from the interior of the vehicle.

In another aspect of the present invention, the night vision camera has a quick release mount including a member attached to the linkage and engaging the night vision camera. The quick release mount may include a first and second electrical interface that cooperates to fix the orientation of the night vision camera with respect to the light.

In another aspect of the present invention, a strap is provided that engages the night vision camera. The strap is biased into locking engagement with a surface to secure the night vision camera to the light.

In another aspect of the present invention, the first and second electrical interface include electrical connections to provide power to the night vision camera, provide a video signal to the vehicle, and adjust imaging parameters of the night vision camera.

In yet another aspect of the present invention, the night vision camera system includes a handle with a quick release mount that is configured to engage the night vision camera. The quick release mount may include a third electrical interface on the handle that is configured to engage the second electrical interface of the night vision camera thereby fixing the orientation of the night vision camera relative to the handle.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

The drawings described herein are for illustration purposes only and are not intended to limit the scope of the present disclosure in any way.

DETAILED DESCRIPTION OF THE INVENTION

Figure 1:
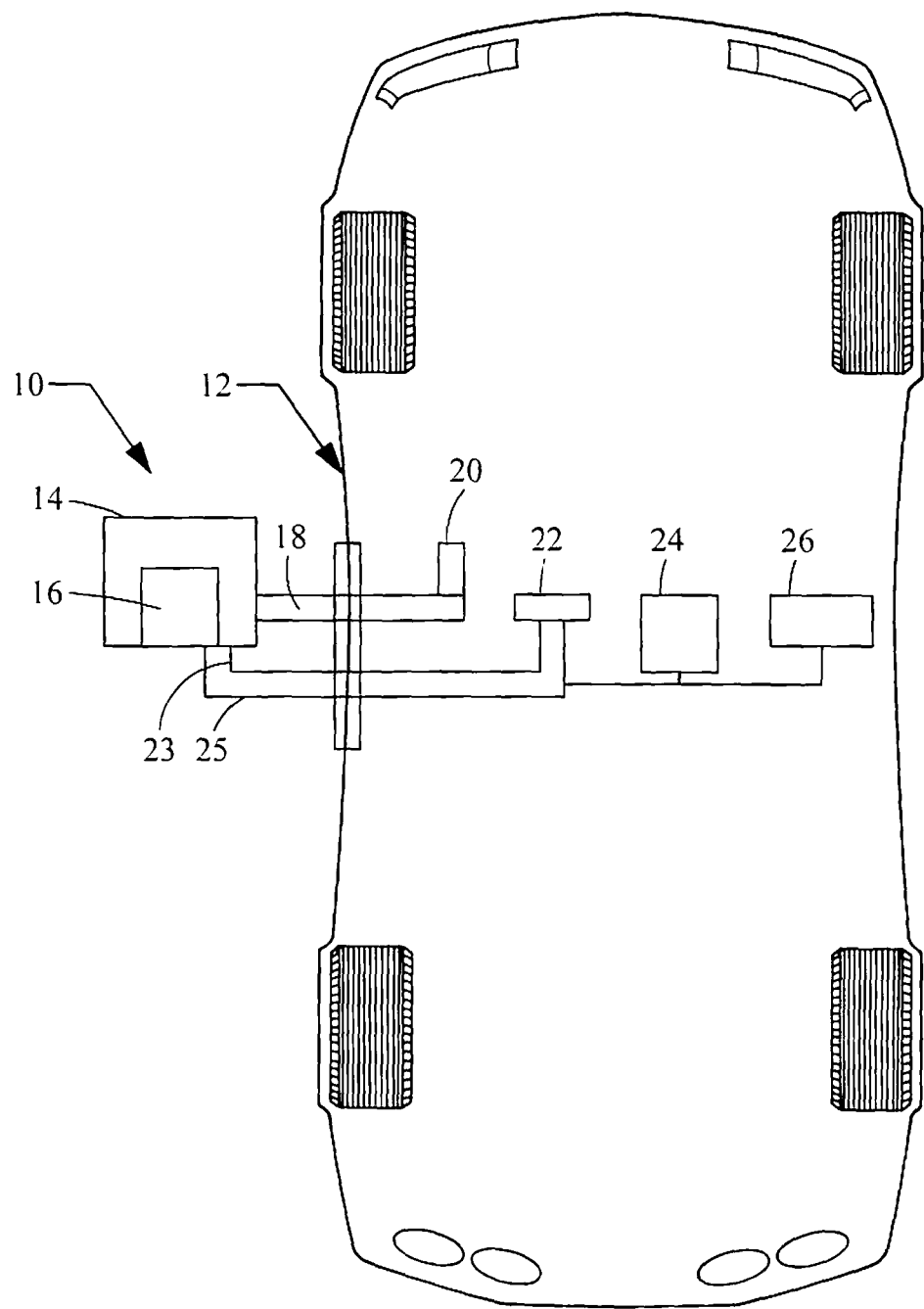
FIG. 1 is a block diagram of a night vision camera system in accordance with the present invention.

The following description is merely exemplary in nature and is in no way intended to limit the present disclosure or its application or uses. It should be understood that throughout the description and drawings, corresponding reference numerals indicate like or corresponding parts and features.

Referring now to FIG. 1, a night vision camera system embodying the principles of the present invention is illustrated therein and designated at 10. The night vision camera system 10 is adapted for use on a vehicle 12 and includes a light 14 and a night vision camera 16.

The night vision camera 16 is mounted to the light 14 such that the orientation between the light 14 and the night vision camera 16 is fixed. The light 14 and the night vision camera 16 are attached to a first end of a linkage 18 that extends through the "A" pillar of the vehicle 12. The linkage 18 includes a handle 20 on the second end of the linkage allowing the user to concurrently manipulate the light 14 and night vision camera 16. Due to the wavelengths of illumination received by the night vision camera 16, the night vision camera 16 is mounted external to the vehicle 12. To provide electrical power, the light 14 is in communication with a power supply 22 along line 23 to selectively supply power to the light 14. The night vision camera 16 is in communication with the power supply 22 to selectively provide power along line 25. In addition, the night vision camera 16 is also in communication with a monitor 24 and a control unit 26 along line 25. The monitor 24 allows the user to view the image received by the night vision camera 16 from inside the vehicle 12. The control unit 26 can optionally provide adjustment to imaging parameters including, for example, gain control and focus of the night vision camera 16.

Figure 2:
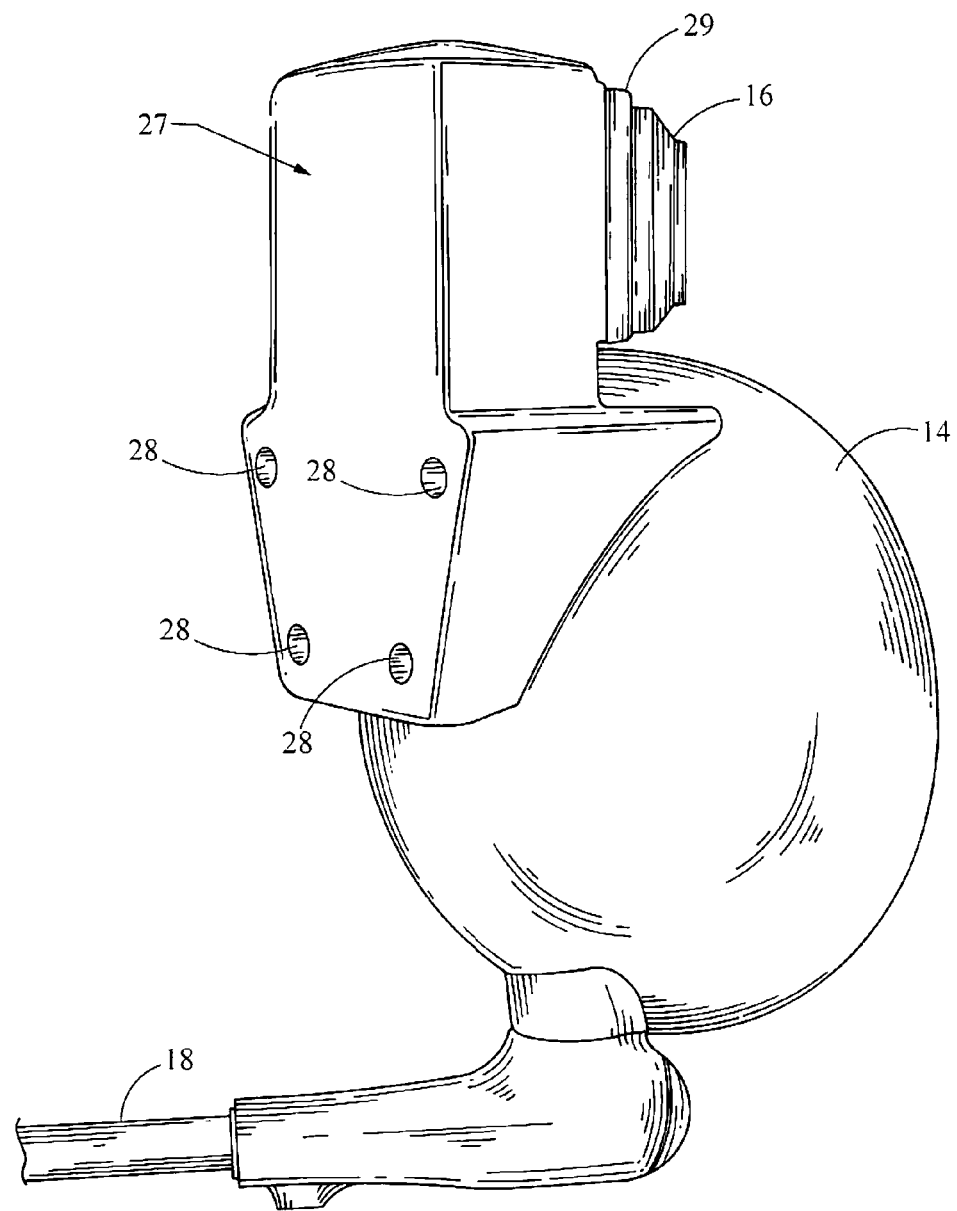
FIG. 2 is an isometric rear view of a night vision camera system and a housing in accordance with the present invention.

Now referring to FIG. 2, the night vision camera 16 is fixedly mounted to the light 14 through a housing 27. The housing 27 is attached to the light 14 by bolts 28. The housing 27 surrounds and protects a majority of the night vision camera 16 including the electrical connections thereto. The night vision camera 16 extends from the housing 27 through a plate 29 to expose an imaging portion of the night vision camera 16. The plate 29 secures the night vision camera 16 within the housing 27 and may include a seal to protect the electrical connections to the night vision camera 16. The housing 27 is configured for a long term or permanent attachment to the light 14 and is configured for optimal protection of the night vision camera 16.

Figure 3:
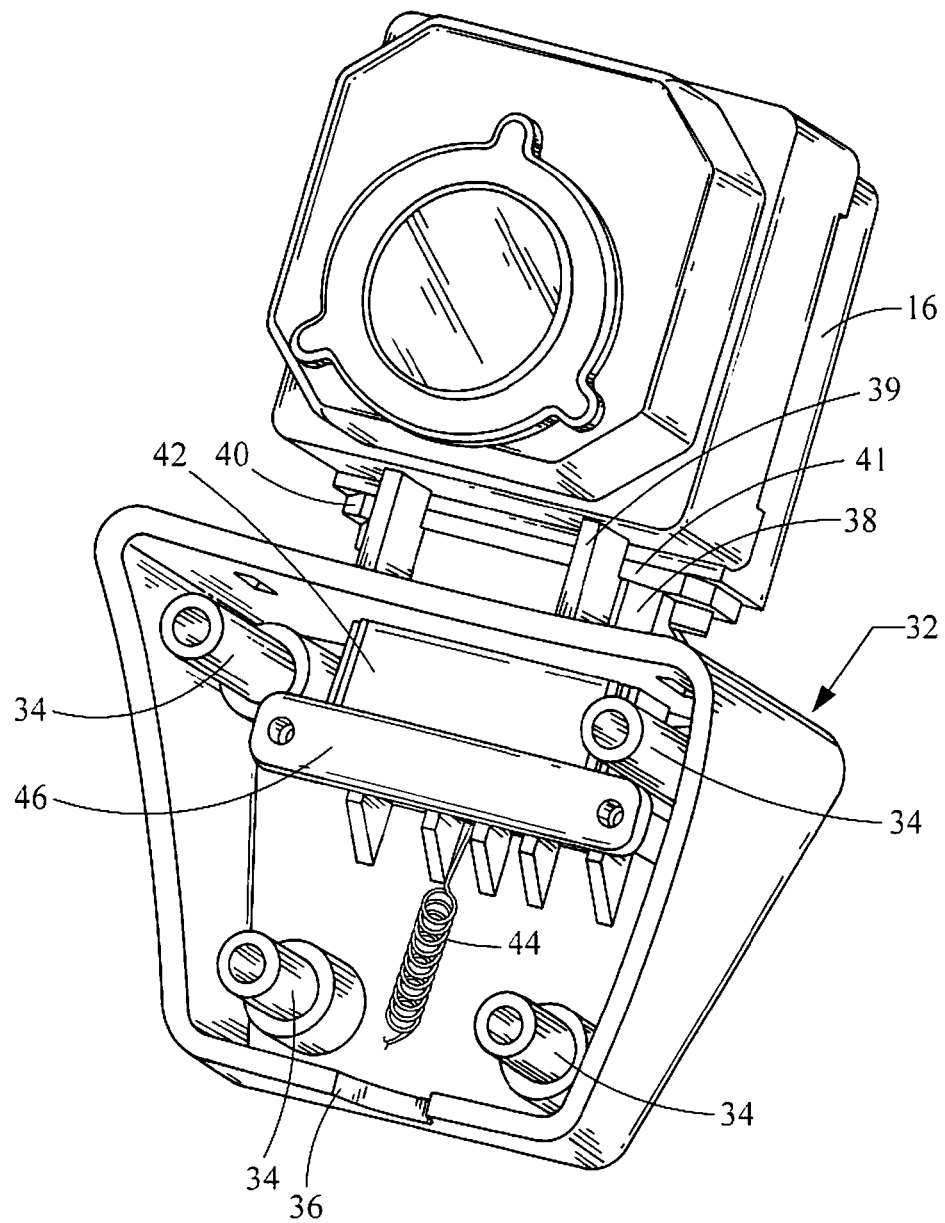
FIG. 3 is a front isometric view of the night vision camera with a quick disconnect mount in accordance with the present invention.

Now referring to FIG. 3, the night vision camera 16 is mounted to the light 14 through a housing 32 using a quick disconnect mount. The housing 32 is attached to the light 14 using bolts inserted through multiple bolt holes 34. An electrical connector 38 of the housing 32 interfaces with an electrical connector 40 of the night vision camera 16. From a mechanical perspective, electrical connector 38 engages electrical connector 40 to fix the orientation of the night vision camera 16, relative to the light 14. The electrical connector 38 includes a latch 39 that lockingly engages a tab 41 on an electrical connector 40 to form a quick release mount between the night vision camera 16 and the light 14.

Generally, a quick release mount fixedly attaches a first component to a second component thereby fixing the orientation and relative position therebetween. In a quick release mount, often a surface of the first component is biased to engage the second component. In addition, the surface can preferably be disengaged from the second component without a separate tool (i.e. screw driver, or wrench). Further, preferably the quick release can be disengaged using a single hand such that a single motion will disengage the surface from the second component. A single motion would include, for example, applying force directly or indirectly against the surface by pushing, pulling, or rotating the surface. With respect to rotating, a user's hand would be able to disengage the quick release mount using a single motion, such as half or single rotation, and would generally not require multiple motions to disengage from the surface.

The electrical connections between connector 38 and connector 40 provide electrical power and optionally control commands to the night vision camera 16. In addition, video and other status output from the night vision camera 16 can also be provided through the electrical connection formed by connector 38 and 40. The conductors from electrical connector 38 extend into a connector housing 42 located within the housing 32. A plate 46 locates connector 38 and secures connector housing 42 relative to the housing 32. An opening 36 is provided at the bottom of the housing 32 to provide clearance for a cable 44 that connects the night vision camera 16 to the interior of the vehicle 12.

Figure 4:
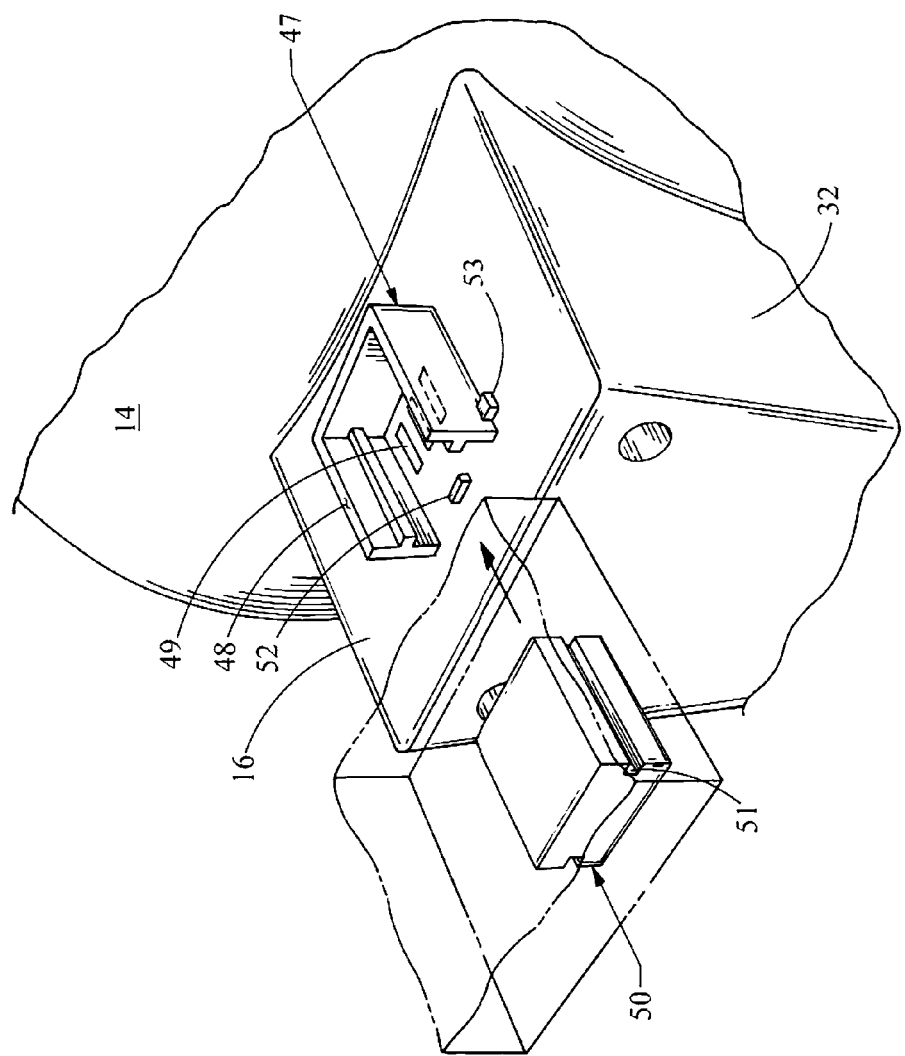
FIG. 4 is an isometric view of another embodiment of a quick disconnect in accordance with the present invention.

Now referring to FIG. 4, another embodiment of a quick disconnect feature is shown. The housing 32 includes a shoe-type connector 47. The connector 47 includes a surface, shown as a lip 48 that is configured to engage a connector 50 on the night vision camera 16. The connector 50 includes a groove 51 that is configured to receive the lip 48 as connector 50 is slidingly engaged by connector 47. A spring-loaded tab 52 is configured to lockingly engage connector 50 after connector 50 has been fully seated within connector 47. A button 53 may be provided to retract tab 52 allowing connector 50 to be slidably released from connector 47. In addition, electrical conductors 49 contact electrical conductors (not shown) on connector 50 to communicate electrical signals between the night vision camera 16 and the interior of the vehicle.

Figure 5:
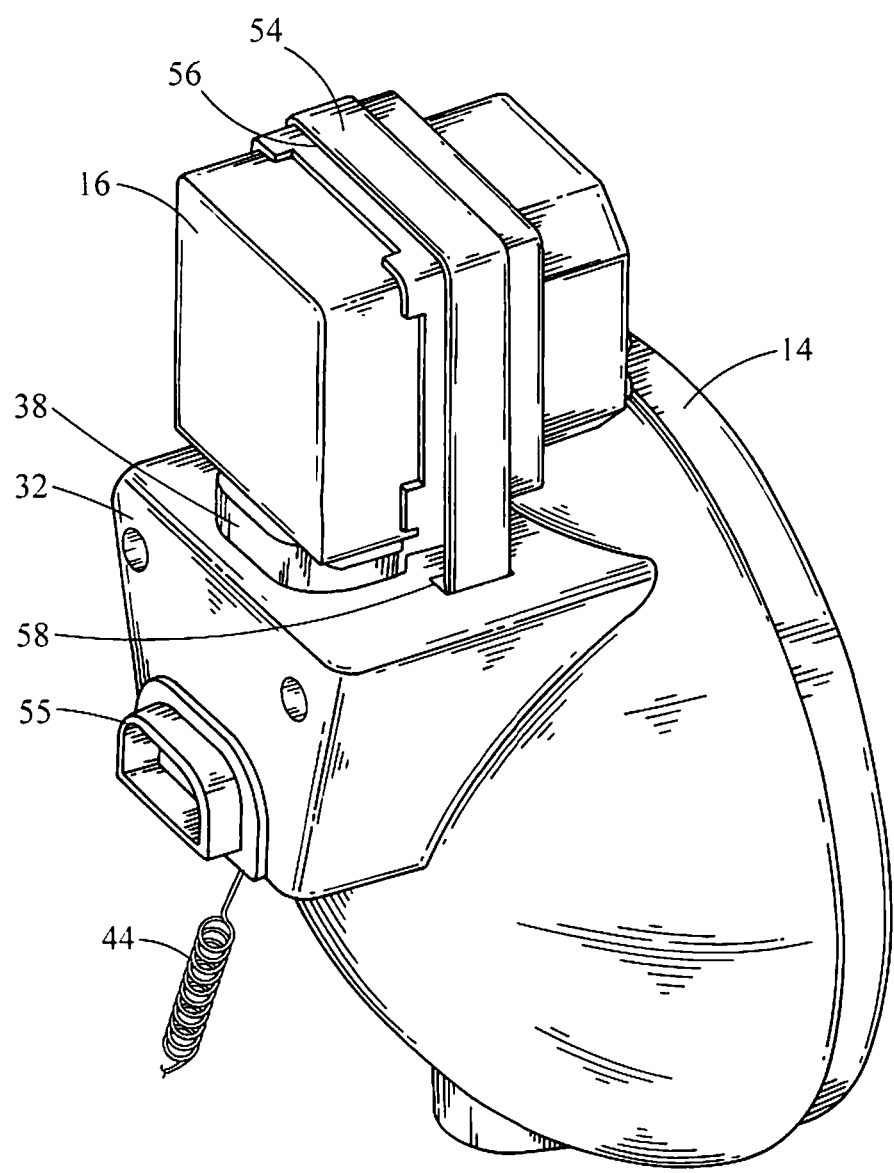
FIG. 5 is a rear isometric view of the night vision camera assembly in accordance with the present invention.
Figure 6:
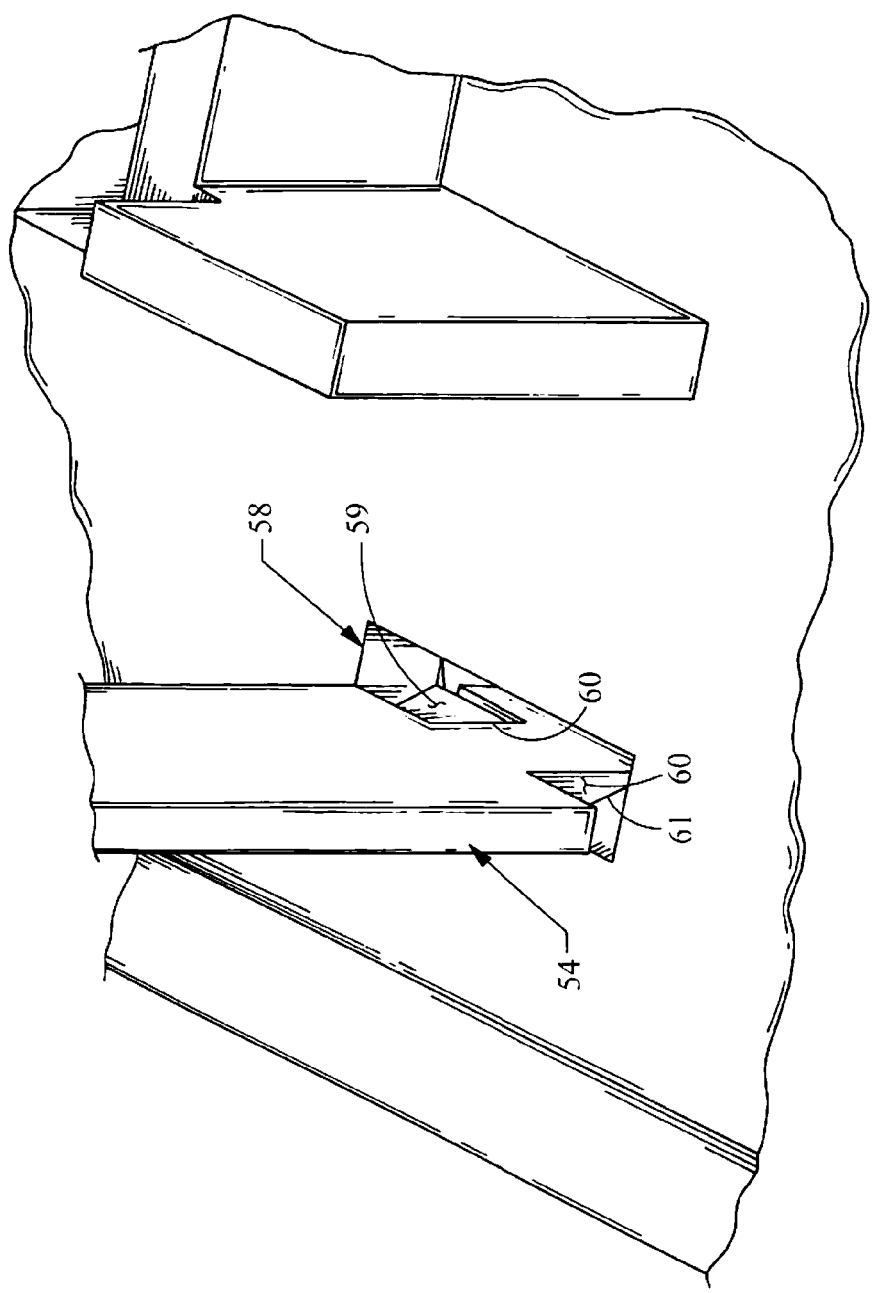
FIG. 6 is an isometric view of the hole and notch arrangement where the strap engages the housing.

Now referring to FIG. 5, another view of the night vision camera 16, housing 32, and the light 14 is provided. In an alternative embodiment, a plug 55 located on the rear of the housing 32 is provided to protect the connector 38 when the night vision camera 16 is removed. Further, a retention strap 54 is provided. The retention strap 54 runs along a groove 56 in the night vision camera 16 to secure the night vision camera 16 in addition to the mechanical connection between connector 38 and 40. A notched hole 58 is provided in the housing 32 allowing the retention strap 54 to engage the night vision camera 16 and latch into the hole 58 in the housing 32 to secure the night vision camera 16. Since the strap 54 is biased away from the camera 16, the hole 58 has an angled surface 59 to guide the strap 54 through the hole 58, as depicted in FIG. 6. As the strap 54 extends through the hole 58, a notch 60 in the strap 54 is biased into locking engagement with a notch 61 the hole 58. The notches 60, 61 having opposing surfaces biased into locking engagement.

Figure 7:
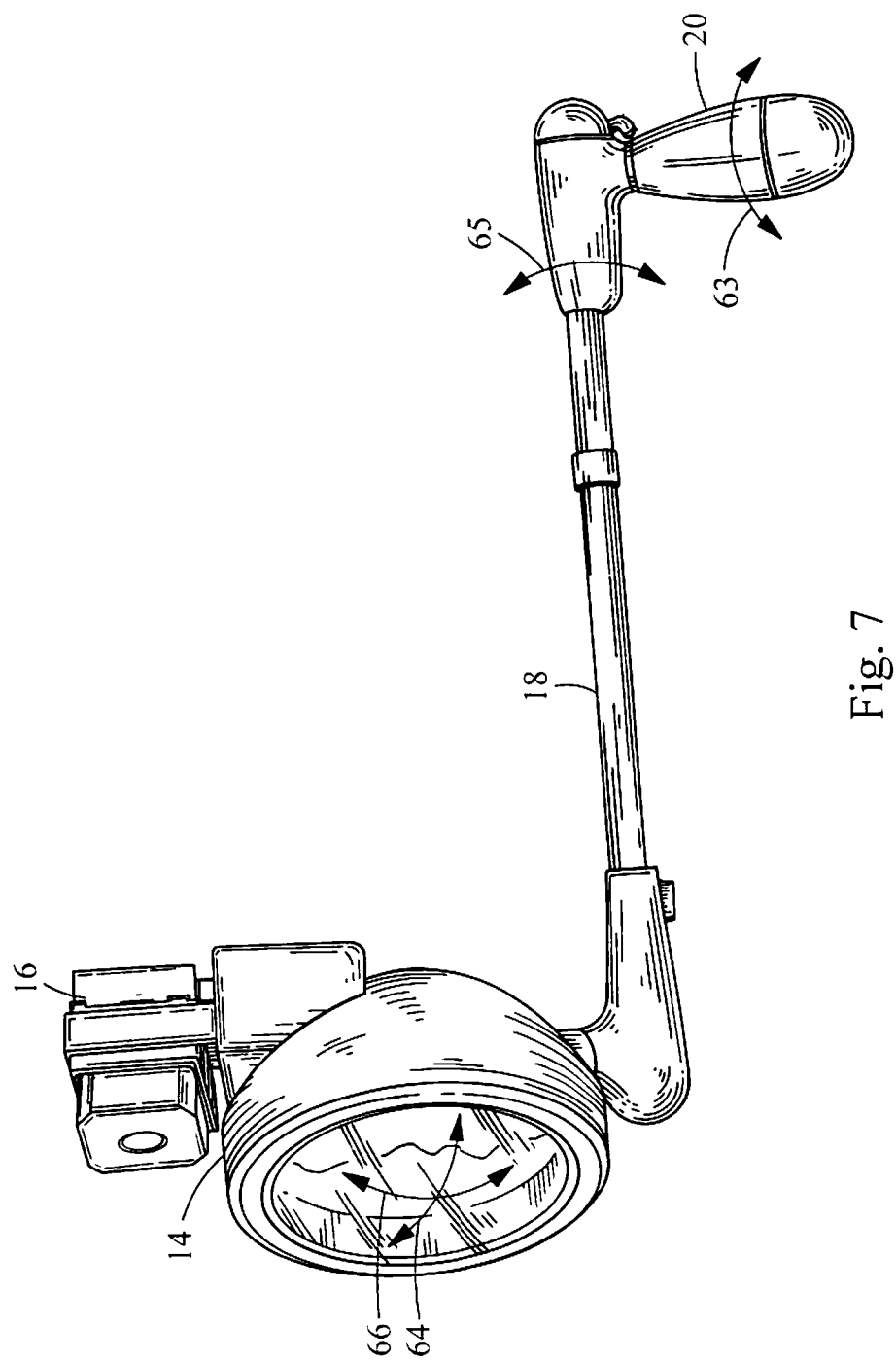
FIG. 7 is a side view of the night vision camera assembly including a linkage in accordance with the present invention.
Figure 8:
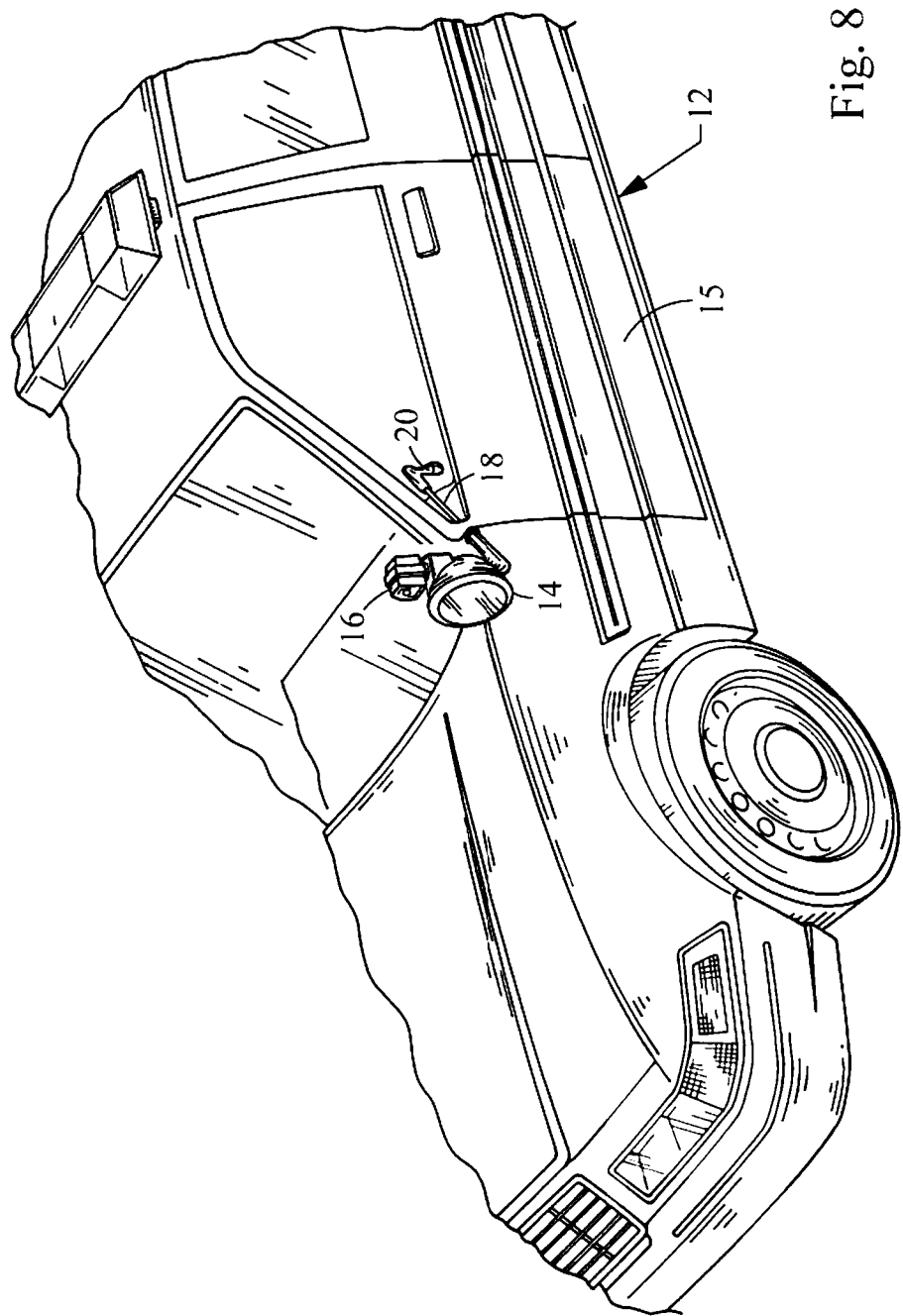
FIG. 8 is an isometric view of a vehicle with an integrated night vision camera assembly in accordance with the present invention.

Now referring to FIG. 7, the light 14 and camera 16 are provided in more detail with respect to the linkage 18 and handle 20. As described above, the night vision camera 16 is attached to the light 14 through the housing 32. The linkage 18 is attached to the light at a first end and is attached to a handle 20 at the second end. The user may rotate the handle 20 as indicated by arrow 63 to generate a side-to-side motion of the light 14 and camera 16 as denoted at 64. In addition, the handle may be rotated about the linkage 18 as indicated by arrow 65 and the light 14 and camera 16 will tilt in an up or down motion as denoted by arrow 66. The manipulation provided by the linkage 18 and the handle 20 of the night vision camera assembly allows the user to better perceive the environment outside the car from the safety and comfort of the inside of the vehicle as further illustrated by FIG. 8.

Figure 9:
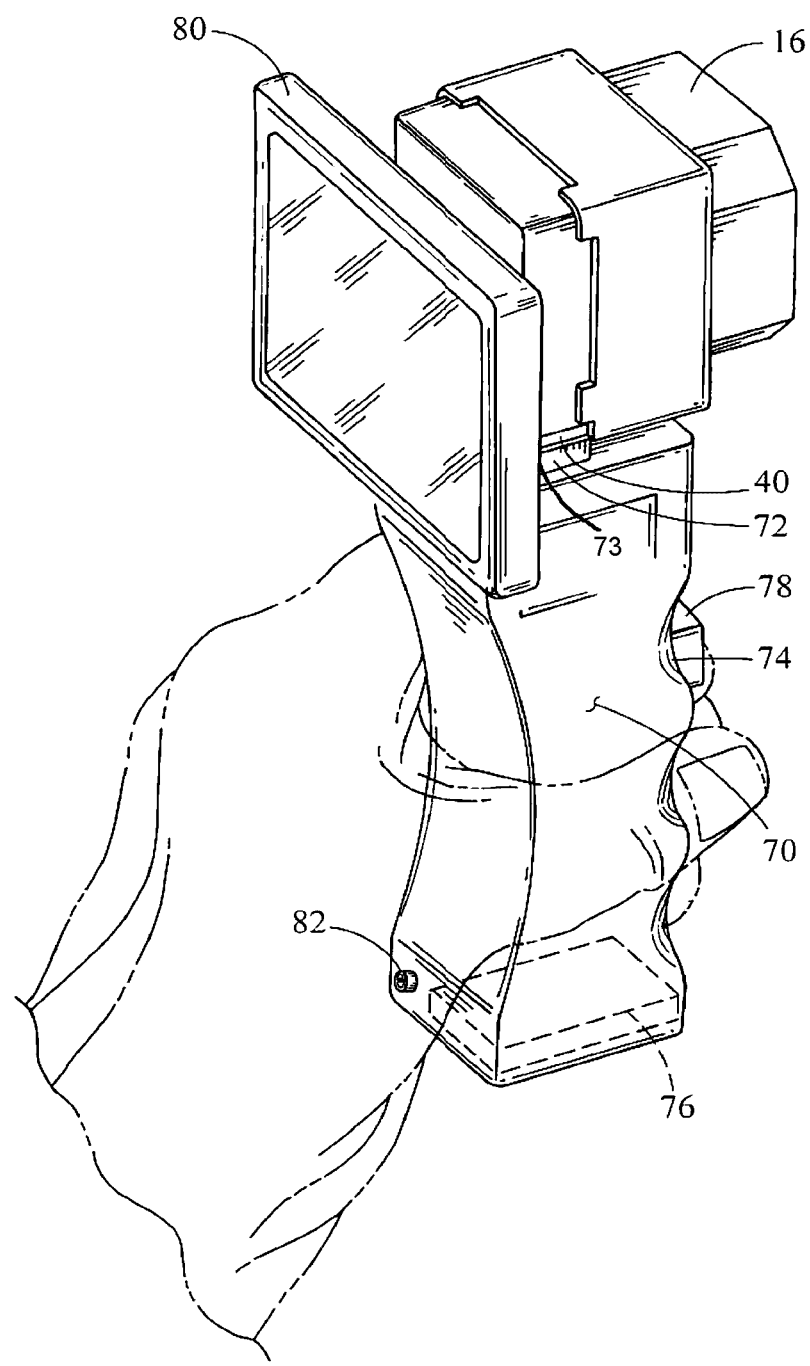
FIG. 9 is a front isometric view of a night vision camera with a quick mount handle assembly in accordance with the present invention.

Now referring to FIG. 9, the night vision camera system also includes a handle 70 that can be used in conjunction with the night vision camera 16. The electrical interface 40 of the night vision camera 16 is configured to engage the electrical interface 72 of the handle 70 mechanically fixing the orientation of the night vision camera with respect to the handle 70. Further a latch 73 is biased to lockingly engage a tab (41 in FIG. 2) on the night vision camera 16 in the manner shown previously in FIG. 2. The handle 70 includes a grip 74 that allows the user to comfortably grasp the handle 70 while using the night vision camera 16 in a dynamic environment. The handle 70 includes a battery 76 that provides power to the night vision camera 16 through the electrical interfaces 70 and 40. The handle 70 may also include a switch 78 that selectively allows the battery 76 to power the night vision camera 16. In addition, a display device 80 may be attached to the handle 70. The display device 80 may receive electrical power from a battery 76 and may receive a video signal from the night vision camera 16 through the electrical interfaces 40 and 72 thereby allowing the user to view the image received by the night vision camera 16 dynamically. Alternatively, the handle may include a video output connector 82 allowing the video signal to be provided to an external display device.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

What is claimed is:

1. A night vision camera assembly mounted on a vehicle that is adaptable for portable use; the night vision camera assembly comprising:
   a night vision camera having a first electrical connector adapted to detachably engage one of a second electrical connector and a third electrical connector in order to provide electrical power to the camera; the second electrical connector being secured to housing that includes a light and a linkage configured for attachment to the vehicle; the third electrical connector being secured to a first handle that includes a battery for portable use;
   the second electrical connector and the third electrical connector including a surface that is biased towards and lockingly engages the first electrical connector to form a quick disconnect mount; and
   the quick disconnect mount capable of being disengaged by manually applying a force against the surface;
   wherein the first handle further includes at least one selected from the group of a display device and a video output connector;
   wherein the display device receives electrical power from the battery and a video signal from the night vision camera, thereby allowing the user to dynamically view the image received by the night vision camera;
   wherein the video output connector is configured to provide the video signal to another external or remote display device.

2. The cameral assembly of claim 1, wherein the manually applied force is one selected from the group of pushing, pulling, or rotating the surface.

3. The camera assembly of claim 2, wherein the rotating force necessary to disengage the quick disconnect mount is less than or equal to one single, full rotation.

4. The camera assembly of claim 1, wherein the night vision camera is further secured to the housing by a retention strap.

5. The camera assembly of claim 4, wherein the night vision camera further comprises a groove and the housing further comprises at least one notched hole; the retention strap designed to engage the night vision camera along the groove and to secure the night vision camera to the housing when the end of the strap engages the notched hole.

6. The camera assembly of claim 5, wherein the notched hole has an angled surface to guide the end of the retention strap through the hole.

7. The camera assembly of claim 5, wherein the notched hole comprises a first notch and the end of the retention strap comprises a second notch, the first and second notches having opposing surfaces that are biased into locking engagement when the end of the retention strap engages the notched hole.

8. The camera assembly of claim 1, wherein the linkage further comprises a second handle located at one end of the linkage; the movement of the second handle capable of generating side-to-side motion and up-down tilting motion of the light and night vision camera.

9. The camera assembly of claim 8, wherein the light and night vision camera are located outside of the vehicle, while the second handle is located inside the vehicle.

10. The camera assembly of claim 1, wherein the engagement of the first electrical connector to the second electrical connector or the third electrical connector further provides the transfer of at least one of control commands to the night vision camera or video output from the night vision camera.

11. The camera assembly of claim 1, wherein the first handle further comprises a switch that selectively allows the battery to power the night vision camera during portable use.

12. A quick disconnect mount for the selective coupling of a night vision camera to a housing that includes a light and a linkage configured for attachment to a vehicle or to a handle that includes a battery for portable use, the quick disconnect mount comprising:
   a first connector coupled to the night vision camera; and
   one of a second connector adapted to be secured to the housing and a third connector adapted to be secured to the handle; the second connector and the third connector adapted to detachably engage the first connector in order to provide electrical power to the camera; the second connector and the third connector including a surface that is biased towards and lockingly engages the first connector to form the quick disconnect mount;
   wherein the quick disconnect mount is capable of being disengaged by manually applying a force against the surface;
   wherein the handle further includes at least one selected from the group of a display device and a video output connector;
   wherein the display device receives electrical power from a battery and a video signal from the night vision camera, thereby allowing the user to dynamically view the image received by the night vision camera;
   wherein the video output connector is configured to provide the video signal to another external or remote display device.

13. The quick disconnect mount of claim 12, wherein the manually applied force is one selected from the group of pushing, pulling, or rotating the surface.

14. The quick disconnect mount of claim 13, wherein the rotating force necessary to disengage the quick disconnect mount is less than or equal to one single, full rotation.

15. The quick disconnect mount of claim 12, wherein the engagement of the first connector to the second connector or the third connector further provides for the transfer of at least one of control commands to the night vision camera or video output from the night vision camera.

* * * * *